US011657612B2

(12) United States Patent
He et al.

(10) Patent No.: US 11,657,612 B2
(45) Date of Patent: May 23, 2023

(54) METHOD AND APPARATUS FOR IDENTIFYING VIDEO (71) Applicant: BEIJING BAIDU NETCOM SCIENCE AND TECHNOLOGY CO., LTD., Beijing (CN)

(72) Inventors: Dongliang He, Beijing (CN); Xiao Tan, Beijing (CN); Shilei Wen, Beijing (CN); Hao Sun, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 110 days.

(21) Appl. No.: 17/194,131

(22) Filed: Mar. 5, 2021

(65) Prior Publication Data

US 2021/0374415 A1 Dec. 2, 2021

(30) Foreign Application Priority Data

May 27, 2020 (CN) .......................... 202010458954.2

(51) Int. Cl.
*G06V 20/40* (2022.01)
*G06F 18/2411* (2023.01)

(52) U.S. Cl.
CPC .......... *G06V 20/40* (2022.01); *G06F 18/2411* (2023.01); *G06V 20/41* (2022.01); *G06V 20/46* (2022.01); *G06V 20/48* (2022.01)

(58) Field of Classification Search
None
See application file for complete search history.

(56) References Cited

U.S. PATENT DOCUMENTS 8,558,952 B2 * 10/2013 Ishikawa ................ G06V 20/40
382/103
9,639,867 B2 * 5/2017 Folkens .............. G06F 16/5866
(Continued)

FOREIGN PATENT DOCUMENTS

CN 106327469 A 1/2017
CN 108664989 A 10/2018
(Continued)

OTHER PUBLICATIONS

Bhardwaj et al., "Efficient Video Classification Using Fewer Frames," *2019 IEEE/CVF Conference on Computer Vision and Pattern Recognition (CVPR)*, pp. 354-363.
(Continued)

*Primary Examiner* — Anand P Bhatnagar
(74) *Attorney, Agent, or Firm* — Seed IP Law Group LLP (57) ABSTRACT

Embodiments of the present disclosure disclose a method and apparatus for identifying a video. A specific embodiment of the method includes: acquiring a predetermined number of video frames from a video to be identified to obtain a video frame sequence; performing the following processing step: importing the video frame sequence into a pre-trained video identification model to obtain a classification tag probability corresponding to the video frame sequence, wherein the classification tag probability is used to characterize a probability of identifying a corresponding tag category of the video to be identified; and setting, in response to the classification tag probability being greater than or equal to a preset identification accuracy threshold, a video tag for the video to be identified according to the classification tag probability, or else increasing the number of video frames in the video frame sequence and continuing to perform the above processing step.

12 Claims, 5 Drawing Sheets

(56) References Cited

U.S. PATENT DOCUMENTS

| | | | |
|---|---|---|---|
| 9,665,595 B2* | 5/2017 | Folkens | G06F 16/5838 |
| 10,140,631 B2* | 11/2018 | Mazur | G06F 16/5866 |
| 10,185,898 B1* | 1/2019 | Folkens | G06V 20/20 |
| 10,223,454 B2* | 3/2019 | Folkens | G06F 16/583 |
| 10,812,815 B2* | 10/2020 | Taylor, II | H04N 19/198 |
| 10,825,048 B2* | 11/2020 | Mazur | G06V 20/20 |
| 11,087,182 B1* | 8/2021 | Folkens | G06V 20/47 |
| 11,132,532 B1* | 9/2021 | Livitz | G06V 10/761 |
| 2010/0172591 A1* | 7/2010 | Ishikawa | G10L 25/48 348/E9.034 |
| 2014/0355907 A1 | 12/2014 | Pesavento et al. | |
| 2017/0185846 A1 | 6/2017 | Hwangbo et al. | |
| 2019/0377956 A1 | 12/2019 | Zheng et al. | |
| 2022/0207274 A1* | 6/2022 | Folkens | G06Q 30/02 |

FOREIGN PATENT DOCUMENTS

| | | |
|---|---|---|
| CN | 109117777 A | 1/2019 |
| CN | 109325148 A | 2/2019 |
| CN | 109947989 A | 6/2019 |
| CN | 110163115 A | 8/2019 |
| CN | 111105117 A | 5/2020 |
| JP | 2011-248680 A | 12/2011 |
| JP | 2013-12163 A | 1/2013 |
| JP | 2020-21110 A | 2/2020 |
| KR | 10-2019-0106865 A | 9/2019 |
| KR | 10-2019-0139751 A | 12/2019 |
| WO | WO 2019037863 A1 | 2/2019 |

OTHER PUBLICATIONS

Extended European Search Report, dated Aug. 25, 2021, for European Application No. 21161270.0, 9 pages.

Wu et al., "AdaFrame: Adaptive Frame Selection for Fast Video Recognition," *2019 IEEE/CVF Conference on Computer Vision and Pattern Recognition (CVPR)*, pp. 1278-1287.

Korean Office Action for Korean Application No. 10-2021-0029738, dated Jul. 13, 2022, 5 pages.

Yu et al., "Classification of Multi-label for Convolution Neural Networks Based on Label Correlation" *Journal of Minnan Normal University (Natural Science)*; 32(2) pp. 19-25, Jun. 2019.

Mahapatra et al., "*Improving Classification Accuracy of YouTube Videos by Exploiting Focal Points in Social Tags*," 2013 IEEE International Conference on Multimedia and Expo Workshops (ICMEW), pp. 1-6, 2013.

Aradhye et al., "Video2Text: Learning to Annotate Video Content," *2009 IEEE International Conference on Data Mining Workshops*, pp. 144-151, 2009.

\* cited by examiner

METHOD AND APPARATUS FOR IDENTIFYING VIDEO

CROSS-REFERENCE TO RELATED APPLICATIONS

This application claims priority to Chinese Patent Application No. 202010458954.2, filed with the China National Intellectual Property Administration (CNIPA) on May 27, 2020, the contents of which are incorporated herein by reference in their entirety.

TECHNICAL FIELD

Embodiments of the present disclosure relate to the field of computer technology, and specifically to a method and apparatus for identifying a video.

BACKGROUND

With the extensive use of intelligent devices and the advancement of network technology, various types of videos (such as football videos, basketball videos, and tennis videos) are widely spread on the Internet. In order to provide users with accurate video information, technicians need to acquire contents of various videos and then set corresponding video tags for the videos.

One of the main problems of video understanding is to identify the contents in the videos. Since a video is composed of an image sequence, a large number of image frames need to be calculated for classifying the videos, and then a video content category can be determined.

SUMMARY

Embodiments of the present disclosure provide a method and apparatus for identifying a video.

In a first aspect, embodiments of the present disclosure provide a method for identifying a video, comprising: acquiring a predetermined number of video frames from a video to be identified to obtain a video frame sequence; performing the following processing step: importing the video frame sequence into a pre-trained video identification model to obtain a classification tag probability corresponding to the video frame sequence, wherein the classification tag probability is used to characterize a probability of identifying a corresponding tag category of the video to be identified; and setting, in response to the classification tag probability being greater than or equal to a preset identification accuracy threshold, a video tag for the video to be identified according to the classification tag probability, or else increasing the number of video frames in the video frame sequence and continuing to perform the above processing step, wherein the video tag is used to identify a content category of the video to be identified.

In some embodiments, the importing comprises: determining a network layer group according to the number of video frames in the video frame sequence, wherein the network layer group includes a predetermined number of network layers, and the network layers are used for feature extraction of the video frames; and performing feature extraction on each video frame in the video frame sequence through the network layer group to obtain the classification tag probability corresponding to the video frame sequence.

In some embodiments, the performing feature extraction comprises: performing feature extraction on each video frame in the video frame sequence through the network layer group to obtain at least one piece of initial target object image information; matching, for the initial target object image information in the at least one piece of initial target object image information, the initial target object image information with a tag set to determine an initial identification accuracy of the initial target object image information, wherein the initial identification accuracy comprises a probability that the initial target object image information belongs to each tag in the tag set; and setting the initial identification accuracy whose value is greater than a predetermined threshold in the at least one initial identification accuracy corresponding to the at least one piece of initial target object image information as the classification tag probability of the video frame sequence, wherein the classification tag probability is related to a final target object image information.

In some embodiments, the performing feature extraction comprises: identifying an object image contained in each video frame of the video frame sequence to obtain at least one piece of initial object image information; querying the number of occurrences of the object image corresponding to the at least one piece of initial object image information in the video frame sequence, and determining position information of the object image corresponding to the at least one piece of initial object image information in each video frame; and determining the at least one piece of initial target object image information according to the number of occurrences and position information.

In some embodiments, the setting a video tag for the video to be identified comprises: setting, in response to the final target object image information being of one piece, a target tag corresponding to the final target object image information as the video tag.

In some embodiments, the setting a video tag for the video to be identified comprises: querying, in response to the final target object image information being of multiple pieces, sequence information of the target object images corresponding to the multiple pieces of final target object image information in the video to be identified, and setting video tags according to the sequence information and the target tags corresponding to the final target object image information.

In a second aspect, embodiments of the present disclosure provide an apparatus for identifying a video, comprising: a video frame sequence acquisition unit, configured to acquire a predetermined number of video frames from a video to be identified to obtain a video frame sequence; a classification tag probability calculation unit, configured to perform the following processing step: importing the video frame sequence into a pre-trained video identification model to obtain a classification tag probability corresponding to the video frame sequence, wherein the classification tag probability is used to characterize a probability of identifying a corresponding tag category of the video to be identified; and a control unit, configured to set, in response to the classification tag probability being greater than or equal to a preset identification accuracy threshold, a video tag for the video to be identified according to the classification tag probability, or else increase the number of video frames in the video frame sequence and continue to perform the above processing step, wherein the video tag is used to identify a content category of the video to be identified.

In some embodiments, the classification tag probability calculation unit comprises: a network layer determination subunit, configured to determine a network layer group according to the number of video frames in the video frame sequence, wherein the network layer group includes a predetermined number of network layers, and the network layers are used for feature extraction of the video frames; and a classification tag probability calculation subunit, configured to perform feature extraction on each video frame in the video frame sequence through the network layer group to obtain the classification tag probability corresponding to the video frame sequence.

In some embodiments, the classification tag probability calculation subunit comprises: an initial target object image information acquisition module, configured to perform feature extraction on each video frame in the video frame sequence through the network layer group to obtain at least one piece of initial target object image information; an initial identification accuracy acquisition module, configured to match, for the initial target object image information in the at least one piece of initial target object image information, the initial target object image information with a tag set to determine an initial identification accuracy of the initial target object image information, wherein the initial identification accuracy comprises a probability that the initial target object image information belongs to each tag in the tag set; and a classification tag probability calculation module, configured to set the initial identification accuracy whose value is greater than a predetermined threshold in the at least one initial identification accuracy corresponding to the at least one piece of initial target object image information as the classification tag probability of the video frame sequence, wherein the classification tag probability is related to a final target object image information.

In some embodiments, the initial target object image information acquisition module comprises: an initial object image information acquisition submodule, configured to identify an object image contained in each video frame of the video frame sequence to obtain at least one piece of initial object image information; an information acquisition submodule, configured to query the number of occurrences of the object image corresponding to the at least one piece of initial object image information in the video frame sequence, and determine position information of the object image corresponding to the at least one piece of initial object image information in each video frame; and an initial target object image information acquisition submodule, configured to determine the at least one piece of initial target object image information according to the number of occurrences and position information.

In some embodiments, the control unit comprises: a first video tag setting subunit, configured to set, in response to the final target object image information being of one piece, a target tag corresponding to the final target object image information as the video tag.

In some embodiments, the control unit comprises: a second video tag setting subunit, configured to query, in response to the final target object image information being of multiple pieces, sequence information of the target object images corresponding to the multiple pieces of final target object image information in the video to be identified, and set video tags according to the sequence information and the target tags corresponding to the final target object image information.

In a third aspect, embodiments of the present disclosure provide an electronic device, comprising: one or more processors; and a Memory, storing one or more programs, wherein the one or more programs, when executed by the one or more processors, cause the one or more processors to implement the method for identifying a video provided by the first aspect.

In a forth aspect, embodiments of the present disclosure provide a computer-readable medium, storing a computer program thereon, wherein the program, when executed by a processor, causes the processor to implement the method for identifying a video provided by the first aspect.

In the method and apparatus for identifying a video according to the embodiments of the present disclosure, a predetermined number of video frames are first acquired from a video to be identified to obtain a video frame sequence; then the video frame sequence is imported into a pre-trained video identification model to obtain a classification tag probability corresponding to the video frame sequence, which realizes the identification of the video to be identified; and finally, when the classification tag probability is greater than or equal to a preset identification accuracy threshold, a video tag is set for the video to be identified according to the classification tag probability, or else the number of video frames in the video frame sequence is increased to continue the classification tag probability until a classification tag probability greater than or equal to the identification accuracy threshold can be obtained. In this way, the identification of the video to be identified can be realized with as few video frames as possible, the amount of data processing in the process of identifying the video can be reduced, and the efficiency of identifying the video can be improved.

It should be understood that the content described in this section is neither intended to identify key or important features of the embodiments of the present disclosure, nor intended to limit the scope of the present disclosure. Other features of the present disclosure will become understandable through the following description.

BRIEF DESCRIPTION OF THE DRAWINGS

The accompanying drawings are used to better understand the solution and do not constitute limitations to the present disclosure. In the figures.

DETAILED DESCRIPTION OF EMBODIMENTS

Exemplary embodiments of the present disclosure will be described below in combination with the accompanying drawings, which include various details of the embodiments of the present disclosure to facilitate understanding and should be regarded as merely exemplary. Therefore, it should be appreciated by those of ordinary skill in the art that various changes and modifications can be made to the embodiments described here without departing from the scope and spirit of the present disclosure. Likewise, for clarity and conciseness, descriptions of well-known functions and structures are omitted in the following description.

Figure 1:
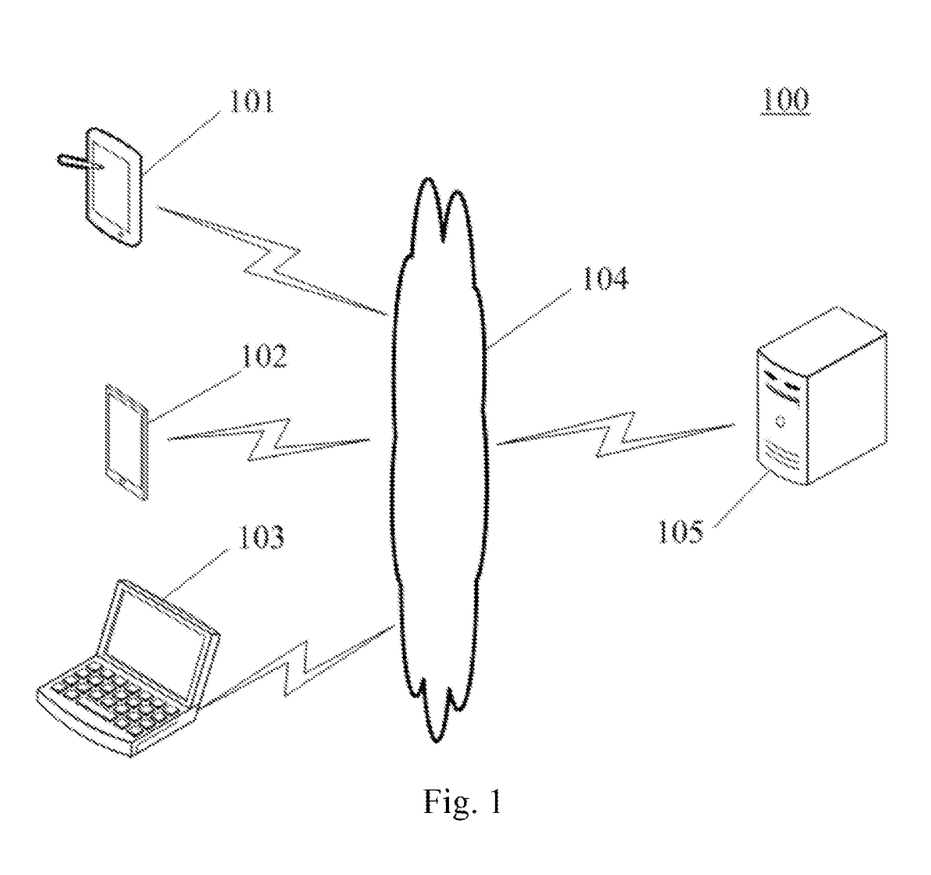
FIG. 1 is a schematic diagram according to a first embodiment of the present disclosure.

FIG. 1 shows an exemplary system architecture 100 to which a method for identifying a video or an apparatus for identifying a video according to the embodiments of the present disclosure may be applied.

As shown in FIG. 1, the system architecture 100 may include a terminal device 101, 102 and 103, a network 104, and a server 105. The network 104 serves as a medium providing a communication link between the terminal device 101, 102 and 103 and the server 105. The network 104 may include various types of connections, such as wired or wireless communication links, or optical fiber cables.

A user may use the terminal device 101, 102 or 103 to interact with the server 105 through the network 104 to receive or send messages. The terminal device 101, 102 or 103 may be installed with various video client applications, such as video browser applications, video playback plug-ins, video search applications, video download tools, and video playback clients.

The terminal device 101, 102 or 103 may be hardware or software. When the terminal device 101, 102 or 103 is hardware, the terminal device may be various electronic devices having a display screen and supporting video playback, including but not limited to a smart phone, a tablet computer, a laptop portable computer and a desktop computer. When the terminal device 101, 102 or 103 is software, the terminal device may be installed in the above-listed electronic devices. The terminal device may be implemented as a plurality of software programs or software modules (for example, used to provide distributed services), or as a single software program or software module, which is not specifically limited here.

The server 105 may be a server providing various services, for example, a server providing videos to the terminal device 101, 102 or 103. The server may analyze the received data such as a web page request, and feed back the processing result (for example, web page data) to the terminal device.

It should be noted that the method for identifying a video according to the embodiments of the present disclosure is generally executed by the server 105, and accordingly, the apparatus for identifying a video is generally arranged in the server 105.

It should be noted that the server may be hardware or software. When the server is hardware, the server may be implemented as a distributed server cluster composed of multiple servers, or implemented as a single server. When the server is software, the server may be implemented as a plurality of software programs or software modules (for example, used to provide distributed services), or as a single software program or software module, which is not specifically limited here.

It should be understood that the numbers of the terminal devices, the network, and the server in FIG. 1 are merely illustrative. Any number of terminal devices, networks and servers may be configured according to actual requirements.

Figure 2:
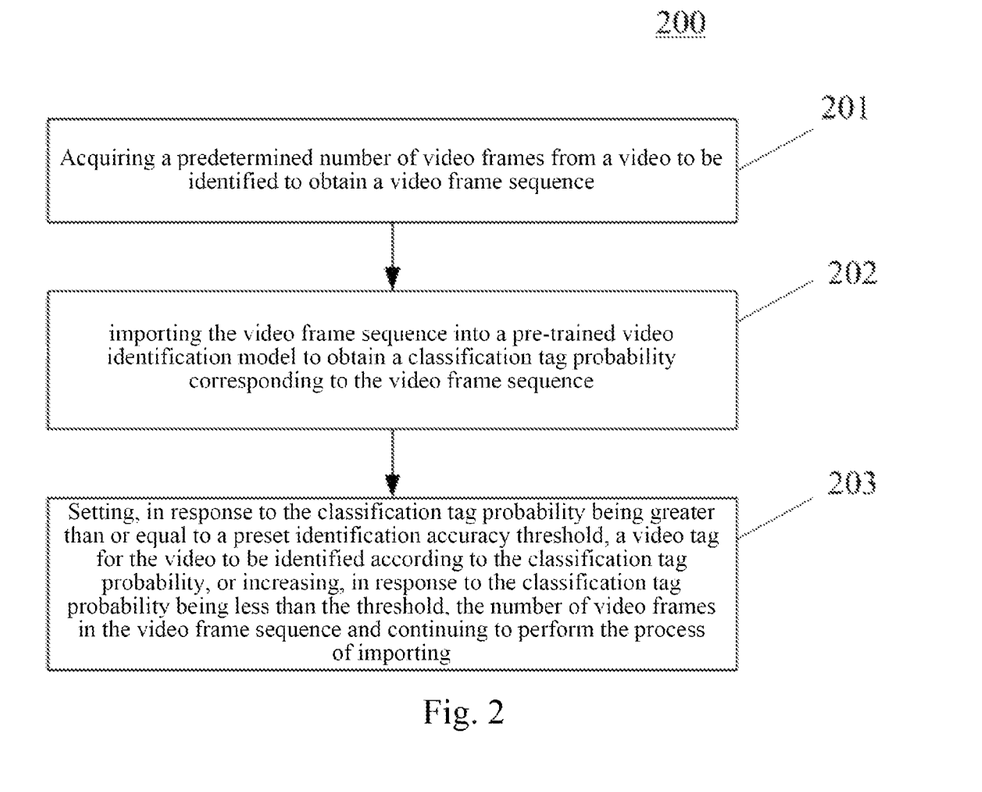
FIG. 2 is a schematic diagram according to a second embodiment of the present disclosure.

Continuing to refer to FIG. 2, a flow 200 of an embodiment of a method for identifying a video according to the present disclosure is shown. The method for identifying a video includes the following steps:

Step 201: acquiring a predetermined number of video frames from a video to be identified to obtain a video frame sequence.

In this embodiment, the execution subject of the method for identifying a video (for example, the server 105 shown in FIG. 1) may acquire the video to be identified.

When the existing video classification method identifies videos, regardless of the difficulty of video identification, the same data processing is performed on the videos. Although the videos can be ultimately identified, the data processing wastes a lot of data processing capacity and time for the videos that are easy to identify.

The execution subject may acquire the predetermined number of video frames from the video to be identified to obtain the video frame sequence. The way to acquire the video frames may be to select the first few video frames of the video to be identified, randomly select the predetermined number of video frames from the entire video to be identified, or evenly select the predetermined number of video frames from the total video frames contained in the video to be identified. It should be noted that, in order to be able to identify the video in the shortest possible time and with the least amount of data processing, the value of "predetermined number" here is usually small. For example, the "predetermined number" may be 2, 5, 10, or the like.

Step 202: performing the following processing step: importing the video frame sequence into a pre-trained video identification model to obtain a classification tag probability corresponding to the video frame sequence.

The execution subject may import the video frame sequence into the pre-trained video identification model. The video identification model may perform data processing on the video frame sequence to obtain the classification tag probability of the video frame sequence. The classification tag probability is used to characterize a probability of identifying a corresponding tag category of the video to be identified. In this way, the identification of the video to be identified is realized.

Step 203: setting, in response to the classification tag probability being greater than or equal to a preset identification accuracy threshold, a video tag for the video to be identified according to the classification tag probability, or else increasing the number of video frames in the video frame sequence and continuing to perform the above processing step.

When the classification tag probability is greater than or equal to the preset identification accuracy threshold, it indicates that the current predetermined number of video frames can accurately represent the content of the video to be identified. Correspondingly, the execution subject may determine the content of the video to be identified through the classification tag probability, and then set the video tag for the video to be identified. The video tag may be used to identify a content category of the video to be identified. When the classification tag probability is smaller than the preset identification accuracy threshold, it indicates that enough information cannot be acquired through the current predetermined number of video frames, and the content of the video to be identified cannot be determined. At this point, the execution subject may increase the number of video frames in the video frame sequence, continue to perform the processing step of step 202 until a classification tag probability greater than or equal to the preset identification accuracy threshold is obtained, and set a video tag through the classification tag probability. In this way, the identification of the video to be identified can be realized with as few video frames as possible, the amount of data processing in the process of identifying the video can be reduced, and the efficiency of identifying the video can be improved.

Figure 3:
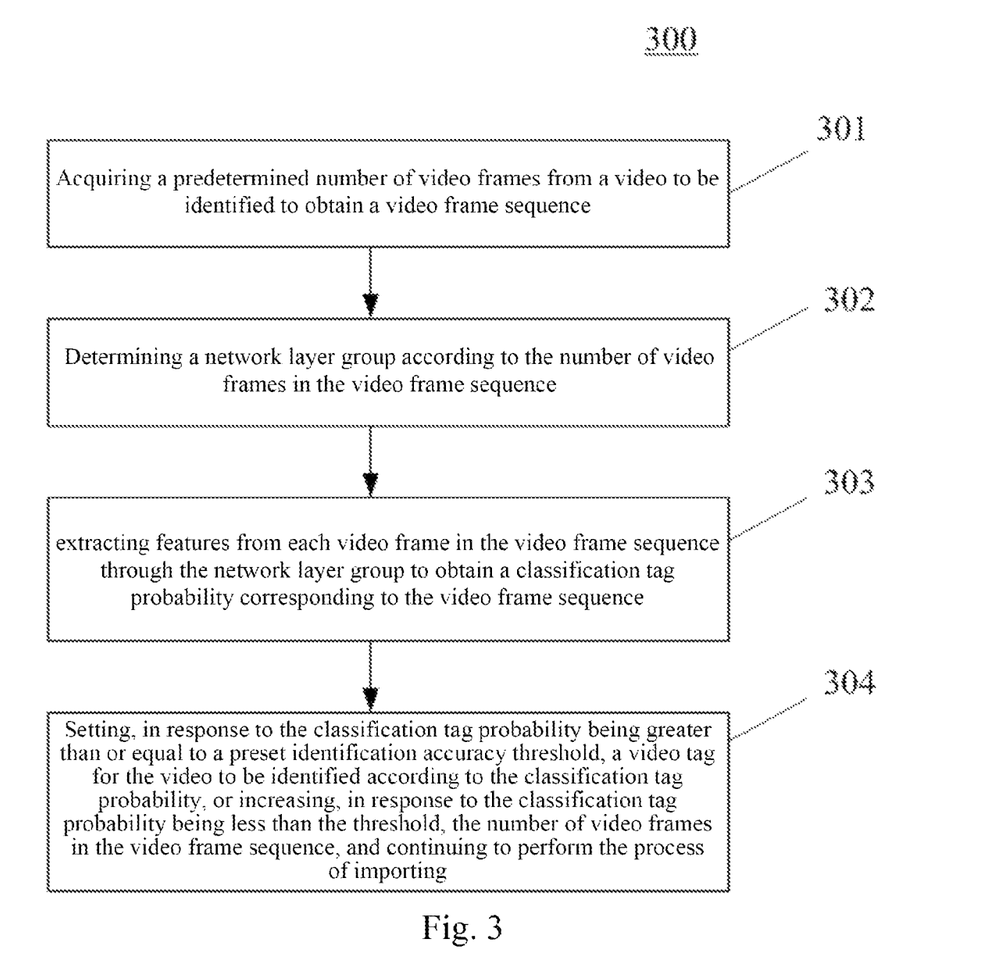
FIG. 3 is a schematic diagram according to a third embodiment of the present disclosure.

Continuing to refer to FIG. 3, a flow 300 of an embodiment of a method for identifying a video according to the present disclosure is shown. The method for identifying a video includes the following steps:

Step 301: acquiring a predetermined number of video frames from a video to be identified to obtain a video frame sequence.

The content of step 301 is the same as that of step 201, and details are not described herein again.

Step 302: determining a network layer group according to the number of video frames in the video frame sequence.

When the number of video frames is small, a classification tag probability of the video to be identified can be determined through fewer network layers. Therefore, the execution subject may determine the network layer group according to the number of video frames in the video frame sequence, which is beneficial to reducing the amount of data processing for identifying the video. The network layer group may include a predetermined number of network layers, and the network layers are used for feature extraction of the video frames. The network layers here may be network layers in an existing video identification network for identifying videos, or network layers for identifying videos in the video identification model.

Step 303: performing feature extraction on each video frame in the video frame sequence through the network layer group to obtain a classification tag probability corresponding to the video frame sequence.

After the network layer group is determined, the execution subject may perform feature extraction on each video frame in the video frame sequence through the network layer group to obtain image content information of each video frame. After that, the execution subject may analyze the image content information to obtain the classification tag probability corresponding to the video frame sequence.

In some optional implementation modes of this embodiment, the performing feature extraction on each video frame in the video frame sequence through the network layer group to obtain a classification tag probability corresponding to the video frame sequence may include the following steps:

Step 1: performing feature extraction on each video frame in the video frame sequence through the network layer group to obtain at least one piece of initial target object image information.

The execution subject may input each video frame in the video frame sequence into the network layer group, and each network layer of the network layer group performs feature extraction on the video frame to obtain the at least one piece of initial target object image information. Specifically, the execution subject may first identify an initial target object image in the video frame, and then convert the initial target object image into a corresponding matrix or vector to obtain initial target object image information.

Step 2: matching, for the initial target object image information in the at least one piece of initial target object image information, the initial target object image information with a tag set to determine an initial identification accuracy of the initial target object image information.

In practice, the video may be classified into a set video category according to the content. Therefore, the execution subject may acquire the tag set in advance, and the tag set may include tags of multiple video types. For example, the tags in the tag set may be dog video tags, cat video tags, bird video tags, fish video tags, and the like. The execution subject may match the initial target object image information with the tag set to determine the initial identification accuracy of the initial target object image information. The initial identification accuracy may include a probability that the initial target object image information belongs to each tag in the tag set. For example, if the video frame includes image information of an animal, and the tag set may include 10 different tags, then the execution subject may match the image information of the animal with each of the 10 tags to calculate the probability that the image information of the animal belongs to each tag. Moreover, the sum of the probabilities that the image information of the animal belongs to respective tags may be 1. For example, if the animal is a dog, the probability corresponding to each of the 10 tags may be: the probability of belonging to a dog video tag is 0.9; the probability of belonging to a cat video tag is 0.05; and so on. In this way, the validity of the initial identification accuracy can be determined.

Step 3: setting the initial identification accuracy whose value is greater than a predetermined threshold in the at least one initial identification accuracy corresponding to the at least one piece of initial target object image information as the classification tag probability of the video frame sequence.

In practice, the object image in the video frame of the video to be identified has a higher matching degree with the corresponding tag, that is, the value of the initial identification accuracy is larger; and the matching degree with the non-corresponding tag is usually low, that is, the value of the initial identification accuracy is small. Accordingly, the execution subject may set the initial identification accuracy whose value is greater than the predetermined threshold in the at least one initial identification accuracy as the classification tag probability of the video frame sequence. As mentioned above, when the object image in the video frame of the video to be identified is an image of a dog, the execution subject obtains by calculation that the probability of belonging to a dog video tag is 0.9. At this time, the value of the initial identification accuracy corresponding to the tag is much larger than others. Therefore, the execution subject may set a threshold, and the predetermined threshold may be used to determine the validity of the initial identification accuracy. The value of the predetermined threshold may be determined according to actual needs. When the classification tag probability is determined, it indicates that the object image in the video frame can be determined, that is, the above classification tag probability could be related to a final target object image information. In this way, the accuracy and validity of obtaining the classification tag probability are improved.

In some optional implementation modes of this embodiment, the performing feature extraction on each video frame in the video frame sequence through the network layer group to obtain at least one piece of initial target object image information may include the following steps:

Step 1: identifying an object image contained in each video frame of the video frame sequence to obtain at least one piece of initial object image information.

The execution subject may identify the object image contained in each video frame of the video frame sequence to obtain the object image in the video frame. Then, the execution subject analyzes the object image, and converts the object image into corresponding initial object image information.

Step 2: querying the number of occurrences of the object image corresponding to the at least one piece of initial object image information in the video frame sequence, and determining position information of the object image corresponding to the at least one piece of initial object image information in each video frame.

A target object image in the video to be identified may not occur in every video frame. In addition, when the target object image occurs in the video frame, it usually occurs in the middle of the video frame. Thus, the execution subject may count the number of occurrences of each piece of initial object image information in the video frame sequence. Then, the execution subject determines the position information of the object image corresponding to each piece of initial object image information in each video frame, and the importance of each object image in the video frame can be determined.

Step 3: determining the at least one piece of initial target object image information according to the number of occurrences and position information.

The execution subject may count and determine the number of occurrences and position information of the object image in the video frame sequence, and mark the initial object image information corresponding to the object image whose occurrences reach a certain number and whose position information is the middle area of the video frame as the initial target object image information. In this way, the validity of identifying the initial target object image information is improved.

Step 304: setting, in response to that classification tag probability being greater than or equal to a preset identification accuracy threshold, a video tag for the video to be identified according to the classification tag probability, or else increasing the number of video frames in the video frame sequence and continuing to perform the above processing step.

The content of step 304 is the same as that of step 203, and details are not described herein again.

Figure 4:
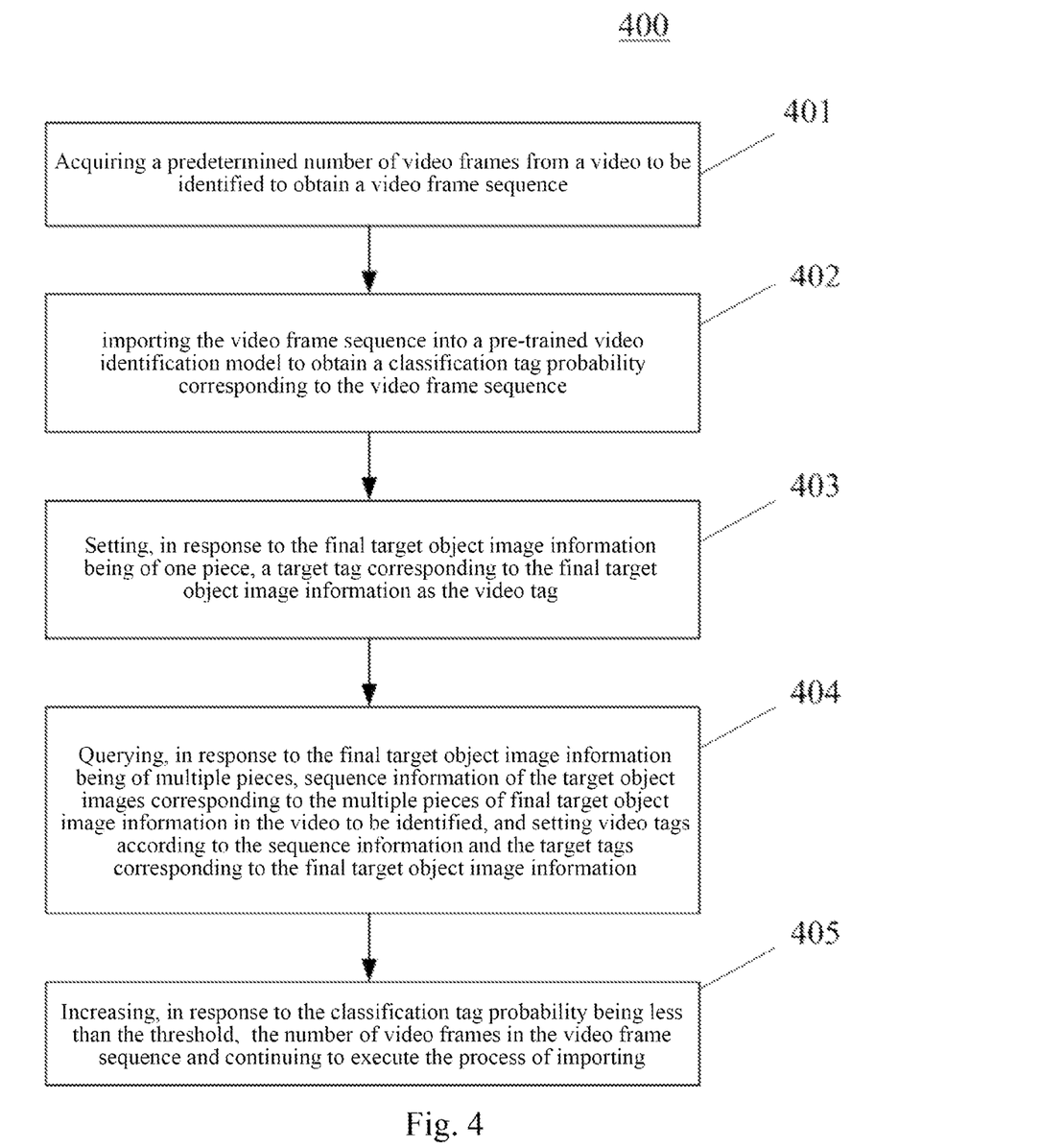
FIG. 4 is a schematic diagram according to a fourth embodiment of the present disclosure.

Further referring to FIG. 4, a flow 400 of another embodiment of a method for identifying a video is shown. The flow 400 of the method for identifying a video includes the following steps:

Step 401: acquiring a predetermined number of video frames from a video to be identified to obtain a video frame sequence.

The content of step 401 is the same as that of step 201, and details are not described herein again.

Step 402: performing the following processing step: importing the video frame sequence into a pre-trained video identification model to obtain a classification tag probability corresponding to the video frame sequence.

The content of step 402 is the same as that of step 202, and details are not described herein again.

Step 403: setting, in response to the final target object image information being of one piece, a target tag corresponding to the final target object image information as the video tag.

When there is only one piece of final target object image information, it indicates that the characteristics of the target object image of the video to be identified are obvious. Then, the execution subject may directly set the target tag corresponding to the final target object image information as the video tag. For example, if the probability of belonging to a dog video tag is 0.9, the execution subject may set the video tag of the video to be identified as the dog video tag. In this way, the speed of obtaining the video tag can be improved.

Step 404: querying, in response to the final target object image information being of multiple pieces, sequence information of the target object images corresponding to the multiple pieces of final target object image information in the video to be identified, and setting video tags according to the sequence information and the target tags corresponding to the final target object image information.

When there are multiple pieces of final target object image information, it indicates that there are multiple main contents of the video to be identified. At this time, the execution subject may query the sequence information of the target object images corresponding to the multiple pieces of final target object image information in the video to be identified, and then set the video tags according to the sequence information and the target tags corresponding to the final target object image information. In this way, users can understand the main content of the video through the video tag. In addition, the video tags can be set according to the sequence of the target object images occurring in the video to be identified, so that the users can also easily understand the contents of the video, and the interpretability of the video is improved.

Step 405: increasing the number of video frames in the video frame sequence and continuing to execute the above processing step.

The content of step 405 is the same as the corresponding content of step 203, and details are not described herein again.

Figure 5:
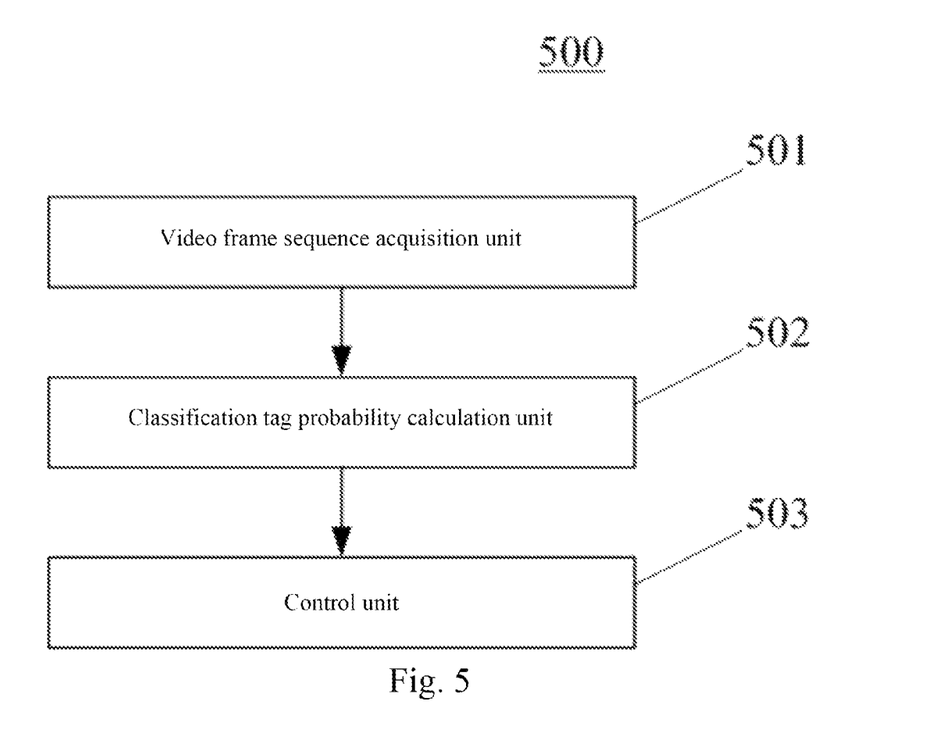
FIG. 5 is a block diagram of an electronic device used to implement the method for identifying a video according to the embodiments of the present disclosure.

Further referring to FIG. 5, as an implementation of the method shown in the above figures, the present disclosure provides an embodiment of an apparatus for identifying a video. The embodiment of the apparatus corresponds to the embodiment of the method shown in FIG. 2, and the apparatus may be applied to various electronic devices.

As shown in FIG. 5, the apparatus 500 for identifying a video in this embodiment may include: a video frame sequence acquisition unit 501, a classification tag probability calculation unit 502, and a control unit 503. The video frame sequence acquisition unit 501 is configured to acquire a predetermined number of video frames from a video to be identified to obtain a video frame sequence; the classification tag probability calculation unit 502 is configured to perform the following processing step: importing the video frame sequence into a pre-trained video identification model to obtain a classification tag probability corresponding to the video frame sequence, wherein the classification tag probability is used to characterize a probability of identifying a corresponding tag category of the video to be identified; and the control unit 503 is configured to set, in response to the classification tag probability being greater than or equal to a preset identification accuracy threshold, a video tag for the video to be identified according to the classification tag probability, or else increase the number of video frames in the video frame sequence and continue to perform the above processing step, wherein the video tag is used to identify a content category of the video to be identified.

In some optional implementation modes of this embodiment, the classification tag probability calculation unit 502 may include: a network layer determination subunit (not shown) and a classification tag probability calculation subunit (not shown). The network layer determination subunit is configured to determine a network layer group according to the number of video frames in the video frame sequence, wherein the network layer group includes a predetermined number of network layers, and the network layers are used for feature extraction of the video frames; and the classification tag probability calculation subunit is configured to perform feature extraction on each video frame in the video frame sequence through the network layer group to obtain the classification tag probability corresponding to the video frame sequence.

In some optional implementation modes of this embodiment, the classification tag probability calculation subunit may include: an initial target object image information acquisition module (not shown), an initial identification accuracy acquisition module (not shown) and a classification tag probability calculation module (not shown). The initial target object image information acquisition module is configured to perform feature extraction on each video frame in the video frame sequence through the network layer group to obtain at least one piece of initial target object image information; the initial identification accuracy acquisition module is configured to match, for the initial target object image information in the at least one piece of initial target object image information, the initial target object image information with a tag set to determine an initial identification accuracy of the initial target object image information, wherein the initial identification accuracy includes a probability that the initial target object image information belongs to each tag in the tag set; and the classification tag probability calculation module is configured to set the initial identification accuracy whose value is greater than a predetermined threshold in the at least one initial identification accuracy corresponding to the at least one piece of initial target object image information as the classification tag probability of the video frame sequence, wherein the classification tag probability is related to a final target object image information.

In some optional implementation modes of this embodiment, the initial target object image information acquisition module may include: an initial object image information acquisition submodule (not shown), an information acquisition submodule (not shown) and an initial target object image information acquisition submodule (not shown). The initial object image information acquisition submodule is configured to identify an object image contained in each video frame of the video frame sequence to obtain at least one piece of initial object image information; the information acquisition submodule is configured to query the number of occurrences of the object image corresponding to the at least one piece of initial object image information in the video frame sequence, and determine position information of the object image corresponding to the at least one piece of initial object image information in each video frame; and the initial target object image information acquisition submodule is configured to determine the at least one piece of initial target object image information according to the number of occurrences and position information.

In some optional implementation modes of this embodiment, the control unit 503 may include: a first video tag setting subunit (not shown), configured to set, in response to the final target object image information being of one piece, a target tag corresponding to the final target object image information as the video tag.

In some optional implementation modes of this embodiment, the control unit 503 may include: a second video tag setting subunit (not shown), configured to query, in response to being the final target object image information being of multiple pieces, sequence information of the target object images corresponding to the multiple pieces of final target object image information in the video to be identified, and set video tags according to the sequence information and the target tags corresponding to the final target object image information.

According to an embodiment of the present disclosure, the present disclosure further provides an electronic device and a readable storage medium.

Figure 6:
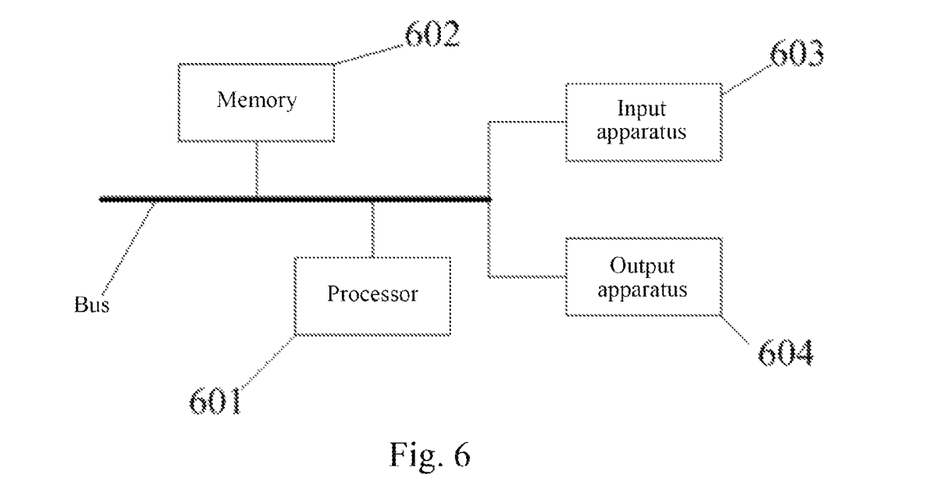
FIG. 6 is a schematic structural diagram of an electronic device adapted to implement the embodiments of the present disclosure.

As shown in FIG. 6, which is a block diagram of an electronic device of a method for identifying a video according to an embodiment of the present disclosure. The electronic device is intended to represent various forms of digital computers, such as laptop computers, desktop computers, workbenches, personal digital assistants, servers, blade servers, mainframe computers, and other suitable computers. The components shown herein, their connections and relationships, and their functions are merely examples, and are not intended to limit the implementation of the present disclosure described and/or claimed herein.

As shown in FIG. 6, the electronic device includes: one or more processors 601, a memory 602, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 6, one processor 601 is used as an example.

The memory 602 is a non-transitory computer readable storage medium provided by the present disclosure. The memory stores instructions executable by at least one processor, so that the at least one processor performs the method for identifying a video provided by the present disclosure. The non-transitory computer readable storage medium of the present disclosure stores computer instructions for causing a computer to perform the method for identifying a video provided by the present disclosure.

The memory 602, as a non-transitory computer readable storage medium, may be used to store non-transitory software programs, non-transitory computer executable programs and modules, such as program instructions/modules corresponding to the method for identifying a video in the embodiments of the present disclosure (for example, the video frame sequence acquisition unit 501, the classification tag probability calculation unit 502 and control unit 503 shown in FIG. 5). The processor 601 executes the non-transitory software programs, instructions, and modules stored in the memory 602 to execute various functional applications and data processing of the server, that is, to implement the method for identifying a video in the foregoing method embodiment.

The memory 602 may include a storage program area and a storage data area, where the storage program area may store an operating system and at least one function required application program; and the storage data area may store data created by the use of the electronic device according to the method for identifying a video, etc. In addition, the memory 602 may include a high-speed random access memory, and may also include a non-transitory memory, such as at least one magnetic disk storage device, a flash memory device, or other non-transitory solid-state storage devices. In some embodiments, the memory 602 may optionally include memories remotely provided with respect to the processor 601, and these remote memories may be connected to the electronic device of the method for identifying a video through a network. Examples of the above network include but are not limited to the Internet, intranet, local area network, mobile communication network, and combinations thereof.

The electronic device of the method for identifying a video may further include: an input apparatus 603 and an output apparatus 604. The processor 601, the memory 602, the input apparatus 603, and the output apparatus 604 may be connected through a bus or in other methods. In FIG. 6, connection through a bus is used as an example.

The input apparatus 603 may receive input digital or character information, and generate key signal inputs related to user settings and function control of the electronic device of the method for identifying a video, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), and the Internet.

The computer system may include a client and a server. The client and the server are generally far from each other and usually interact through the communication network. The relationship between the client and the server is generated by computer programs that run on the corresponding computer and have a client-server relationship with each other.

According to the technical solutions of the embodiments of the present disclosure, the identification of the video to be identified can be realized with as few video frames as possible, the amount of data processing in the process of identifying the video can be reduced, and the efficiency of identifying the video can be improved.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for identifying a video, comprising:
    acquiring a predetermined number of video frames from a video to be identified to obtain a video frame sequence;
    importing the video frame sequence into a pre-trained video identification model to obtain a classification tag probability corresponding to the video frame sequence, wherein the classification tag probability is used to characterize a probability of identifying a corresponding tag category of the video to be identified; and
    setting, in response to the classification tag probability being greater than or equal to a preset identification accuracy threshold, a video tag for the video to be identified according to the classification tag probability, or
    increasing, in response to the classification tag probability being less than the threshold, the number of video frames in the video frame sequence and continuing to perform the process of importing,
    wherein the video tag is used to identify a content category of the video to be identified.

2. The method according to claim 1, wherein the importing comprises:
    determining a network layer group according to the number of video frames in the video frame sequence, wherein the network layer group comprises a predetermined number of network layers, and the network layers are used for feature extraction of the video frames; and extracting features from each video frame in the video frame sequence through the network layer group to obtain the classification tag probability corresponding to the video frame sequence.

3. The method according to claim 2, wherein the extracting comprises:

obtaining at least one piece of initial target object image information by extracting features from each video frame in the video frame sequence through the network layer group;

matching, for the initial target object image information in the at least one piece of initial target object image information, the initial target object image information with a tag set to determine an initial identification accuracy of the initial target object image information, wherein the initial identification accuracy comprises a probability that the initial target object image information belongs to each tag in the tag set; and setting the initial identification accuracy whose value is greater than a predetermined threshold in the at least one initial identification accuracy corresponding to the at least one piece of initial target object image information as the classification tag probability of the video frame sequence, wherein the classification tag probability is related to a final target object image information.

4. The method according to claim 3, wherein the obtaining comprises:

identifying an object image contained in each video frame of the video frame sequence to obtain at least one piece of initial object image information;

querying the number of occurrences of the object image corresponding to the at least one piece of initial object image information in the video frame sequence, and determining position information of the object image corresponding to the at least one piece of initial object image information in each video frame; and determining the at least one piece of initial target object image information according to the number of occurrences and position information.

5. The method according to claim 3, wherein the setting a video tag for the video to be identified comprises:

setting, in response to the final target object image information being of one piece, a target tag corresponding to the final target object image information as the video tag.

6. The method according to claim 3, wherein the setting a video tag for the video to be identified comprises:

querying, in response to the final target object image information being of multiple pieces, sequence information of the target object images corresponding to the multiple pieces of final target object image information in the video to be identified, and setting video tags according to the sequence information and the target tags corresponding to the final target object image information.

7. An electronic device, comprising:
one or more processors; and
a memory, storing one or more programs thereon, wherein the one or more programs, when executed by the one or more processors, cause the one or more processors to perform an operation for identifying a video, comprising:
acquiring a predetermined number of video frames from a video to be identified to obtain a video frame sequence;

importing the video frame sequence into a pre-trained video identification model to obtain a classification tag probability corresponding to the video frame sequence, wherein the classification tag probability is used to characterize a probability of identifying a corresponding tag category of the video to be identified; and setting, in response to the classification tag probability being greater than or equal to a preset identification accuracy threshold, a video tag for the video to be identified according to the classification tag probability, or increasing, in response to the classification tag probability being less than the threshold, the number of video frames in the video frame sequence and continuing to perform the process of importing, wherein the video tag is used to identify a content category of the video to be identified.

8. The device according to claim 7, wherein the importing comprises:

determining a network layer group according to the number of video frames in the video frame sequence, wherein the network layer group comprises a predetermined number of network layers, and the network layers are used for feature extraction of the video frames; and extracting features from each video frame in the video frame sequence through the network layer group to obtain the classification tag probability corresponding to the video frame sequence.

9. The device according to claim 8, wherein the extracting comprises:

obtaining at least one piece of initial target object image information by extracting features from each video frame in the video frame sequence through the network layer group;

matching, for the initial target object image information in the at least one piece of initial target object image information, the initial target object image information with a tag set to determine an initial identification accuracy of the initial target object image information, wherein the initial identification accuracy comprises a probability that the initial target object image information belongs to each tag in the tag set; and setting the initial identification accuracy whose value is greater than a predetermined threshold in the at least one initial identification accuracy corresponding to the at least one piece of initial target object image information as the classification tag probability of the video frame sequence, wherein the classification tag probability is related to a final target object image information.

10. The device according to claim 9, wherein the obtaining comprises:

identifying an object image contained in each video frame of the video frame sequence to obtain at least one piece of initial object image information;

querying the number of occurrences of the object image corresponding to the at least one piece of initial object image information in the video frame sequence, and determining position information of the object image corresponding to the at least one piece of initial object image information in each video frame; and determining the at least one piece of initial target object image information according to the number of occurrences and position information.

11. The device according to claim 9, wherein the setting a video tag for the video to be identified comprises:

setting, in response to the final target object image information being of one piece, a target tag corresponding to the final target object image information as the video tag.

12. The device according to claim 9, wherein the setting a video tag for the video to be identified comprises:

querying, in response to the final target object image information being of multiple pieces, sequence information of the target object images corresponding to the multiple pieces of final target object image information in the video to be identified, and setting video tags according to the sequence information and the target tags corresponding to the final target object image information.

* * * * *